United States Patent
Fleming, Jr. et al.

(10) Patent No.: US 7,089,751 B2
(45) Date of Patent: Aug. 15, 2006

(54) AUTOMATIC FRESH AIR EXCHANGE SYSTEM

(75) Inventors: Malcolm N. Fleming, Jr., Syracuse, NY (US); Gilbert Barry Hofsdal, Canastota, NY (US)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 10/831,473

(22) Filed: Apr. 23, 2004

(65) Prior Publication Data
US 2005/0235658 A1 Oct. 27, 2005

(51) Int. Cl.
F24F 3/16 (2006.01)
(52) U.S. Cl. ......................................................... 62/78
(58) Field of Classification Search ............... 62/62, 62/78, 239, 179; 426/418, 419; 422/40, 422/83; 99/467, 468; 73/863.81
See application file for complete search history.

(56) References Cited

U.S. PATENT DOCUMENTS

| 3,563,757 A | * | 2/1971 | Dixon ........................ 99/472 |
| 4,566,282 A | * | 1/1986 | Knoblauch et al. .......... 62/46.3 |
| 4,742,761 A | * | 5/1988 | Horstman .................... 454/74 |
| 4,894,997 A | * | 1/1990 | Urushizaki et al. ............ 62/78 |
| 4,961,322 A | * | 10/1990 | Oguma et al. ................ 62/179 |
| 5,156,009 A | * | 10/1992 | Woodruff ........................ 62/78 |
| 5,215,498 A | * | 6/1993 | Wong et al. ................. 454/208 |
| 5,355,781 A | * | 10/1994 | Liston et al. ................... 99/476 |
| 5,437,837 A | * | 8/1995 | Olson et al. .................... 422/3 |
| 5,457,963 A | * | 10/1995 | Cahill-O'Brien et al. ...... 62/78 |
| 5,462,485 A | * | 10/1995 | Kinkead ...................... 454/256 |
| 5,872,721 A | * | 2/1999 | Huston et al. ................. 702/24 |
| 6,092,430 A | * | 7/2000 | Liston et al. ............. 73/863.81 |
| 6,110,038 A | * | 8/2000 | Stern ........................... 454/343 |

FOREIGN PATENT DOCUMENTS

JP 10-98949 A * 4/1998

OTHER PUBLICATIONS

PCT Search Report Jan. 31, 2006.

* cited by examiner

*Primary Examiner*—Mohammad M. Ali
(74) *Attorney, Agent, or Firm*—Niro, Scavone, Haller & Niro

(57) ABSTRACT

A system and method for automatically providing a fresh air exchange to a cargo unit is disclosed. The system includes a single gas sensor, preferably a carbon dioxide sensor, for providing an input to a controller which derives the carbon dioxide and oxygen levels in the unit. The controller then compares such derived values to preselected levels and selectively opens or closes air flow into the cargo unit in order to bring and maintain the desired oxygen and carbon dioxide levels within the unit.

11 Claims, 3 Drawing Sheets

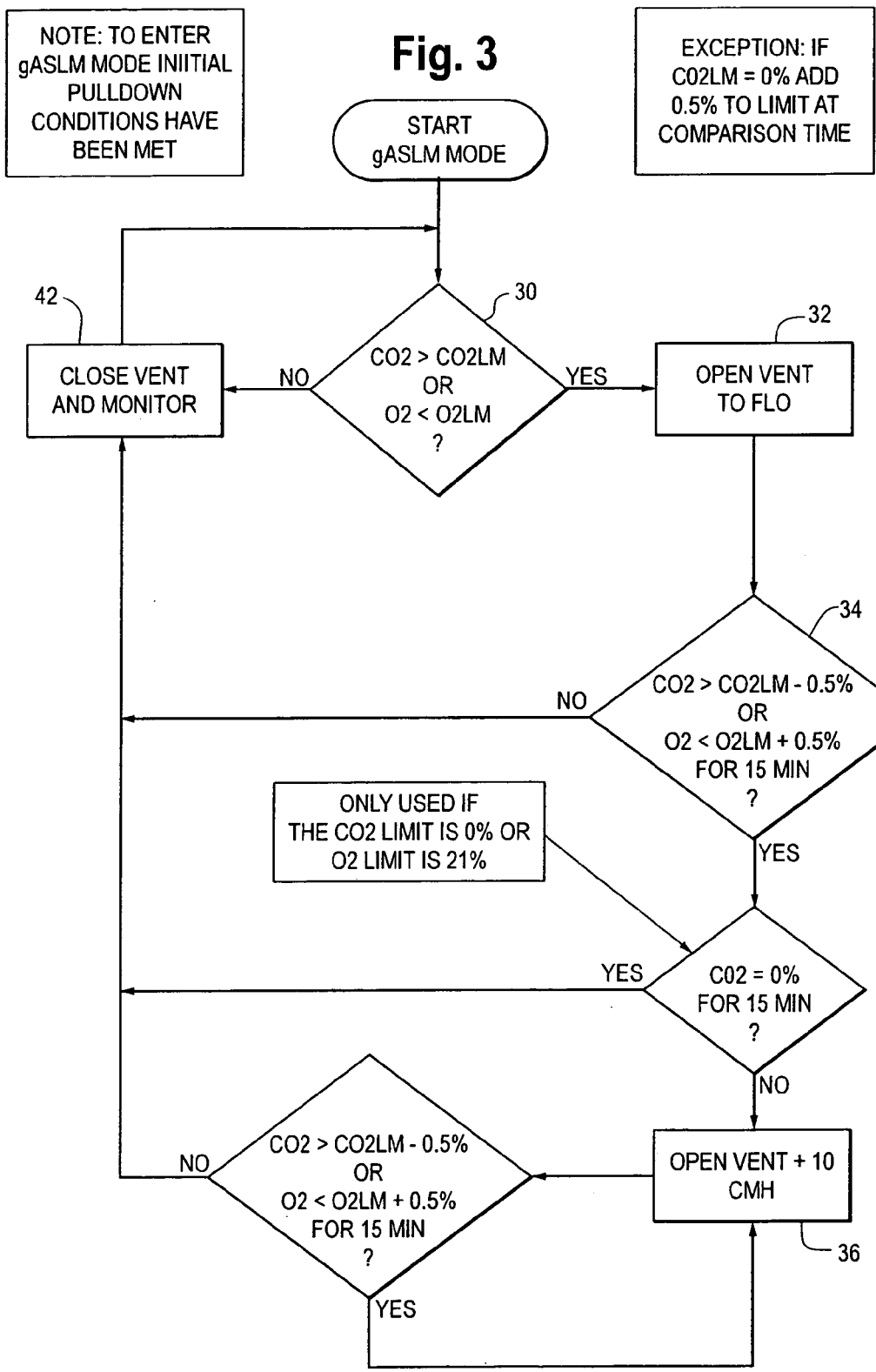

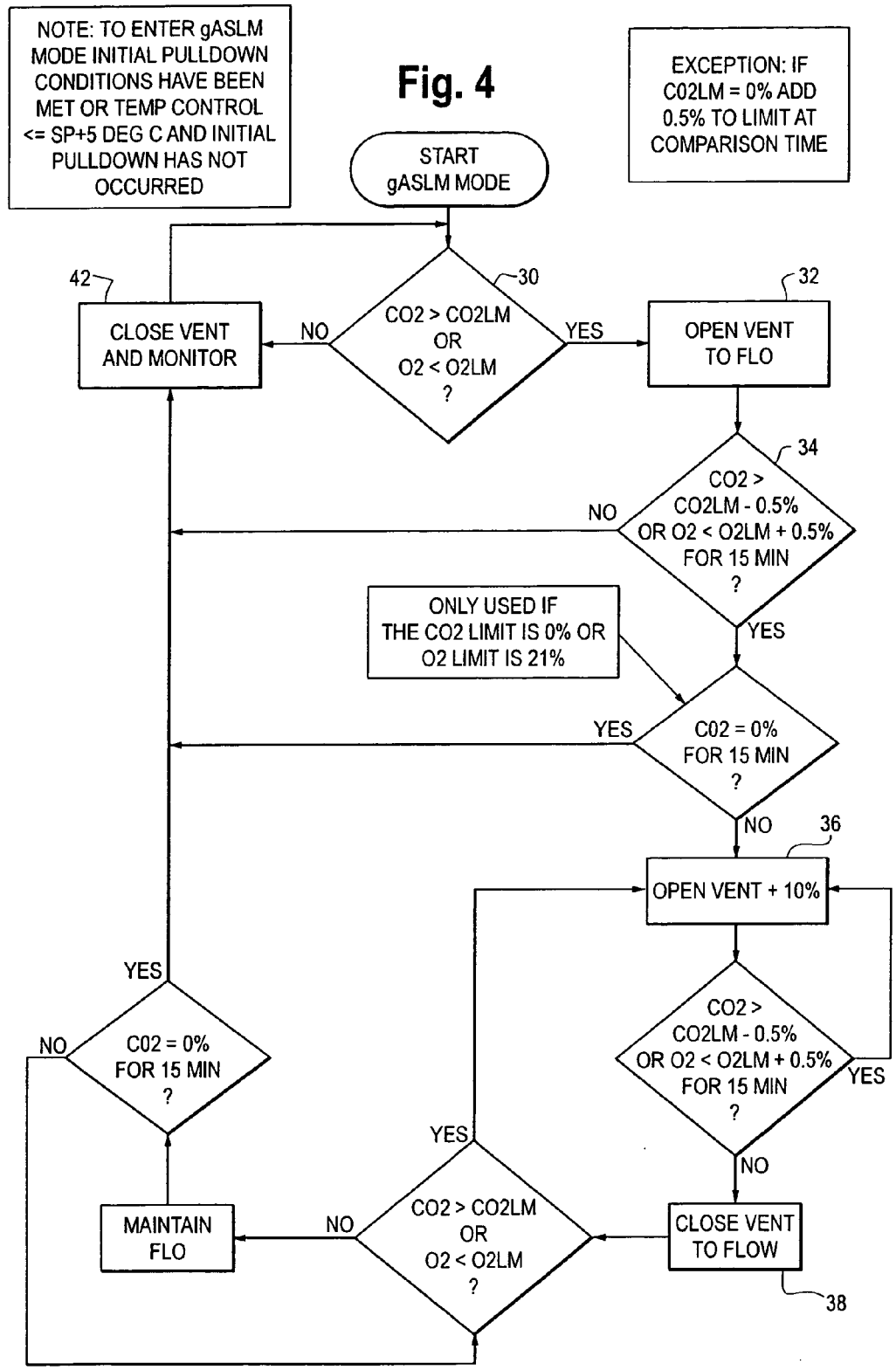

AUTOMATIC FRESH AIR EXCHANGE SYSTEM

I. FIELD OF THE INVENTION

The field of the present invention relates to control systems for transport refrigeration systems. More specifically, the present invention is directed towards alternative means for determining the amounts of carbon dioxide and oxygen in a transport refrigeration unit using a single sensor and to precisely maintain the levels of such gases in a transport refrigeration unit near or within preselected limits.

II. DESCRIPTION OF THE PRIOR ART

A transport refrigeration system used to control the environment in enclosed areas, such as the insulated box used on trucks, trailers, containers, or similar intermodal units, functions by absorbing heat from the enclosed area and releasing heat outside of the box into the environment. In addition, certain perishable items typically transported in such boxes (e.g., produce) will respirate over time, producing carbon dioxide while using up available oxygen in the box. If the concentration of oxygen gets too low or the concentration of carbon dioxide gets too high, the cargo can be damaged (e.g., it spoils). Fresh air exchanges are thus used to prevent this undesirable result, wherein intake and exhaust openings are opened into the box, and a pressure differential draws fresh air into the intake and pushes the carbon dioxide laden air out of the exhaust. It is important, however, that the exchange avoids providing excessive amounts of fresh air, as such air would tend to dry out the produce, and bringing in a larger flow of warmer fresh air would create an unacceptably large power draw on the system (i.e., by providing too much warm ambient air to cool).

A number of transport refrigeration units, including units currently sold by the assignee of the present invention, employ a manual fresh air exchange system in an attempt to avoid these problems. In such a system, personnel involved in the shipping process (e.g., a ship hand or terminal personnel) typically sets fresh air settings manually. However, if the personnel do not provide the proper settings (e.g., the vent is opened too soon, or too late, or at the wrong exchange flow rate), or if the cargo box unexpectedly deviates from desired oxygen or carbon dioxide levels, the problems described above will arise.

Other transport refrigeration systems currently employ a variety of controls to sense directly the carbon dioxide and oxygen levels and to open and close the intake and exhaust to the cargo box in response to deviations from set points for such gases. For example, U.S. Pat. No. 6,595,847 B1 (Freese et al.), discusses and discloses the use of separate oxygen and carbon dioxide sensors in conjunction with a container refrigeration control system. The Freese patent discloses the desirability of sensing an oxygen level with an oxygen sensor and sensing a carbon dioxide level with a carbon dioxide sensor in a container, and then adjusting a door between first (open) and second (closed) positions based upon deviations in the container from preselected set points. This system, too, provides a number of problems. First, the use of separate oxygen and carbon dioxide sensors provides for unnecessary complexity and cost. Second, the most cost efficient commercially available oxygen sensors require specific calibrations with specialized gas containing no oxygen and using normal atmospheric gas at 21% oxygen. Thus, the use of an additional oxygen sensor requires more service and more support (and therefore more cost and time) than is commercially desirable.

The inventors of the present invention have determined that the amount of oxygen and carbon dioxide in a closed cargo box which has normal atmospheric gases equals (approximately) a constant. This fact does not change by virtue of respiration of the cargo, or by inflow of fresh air from an exchange. Thus, the oxygen and carbon dioxide levels within the cargo box can be approximated by the input of a single gas sensor. The applicants have found that, in order to provide a simple and efficient system for controlling the gases within a transport refrigeration system, it is desirable to use a controller within the transport refrigeration system which determines the oxygen and carbon dioxide levels in a cargo box from a single gas sensor (preferably a carbon dioxide sensor) which compares the results of such calculations to preselected levels (e.g., limits) entered by an operator and actuates openings to the cargo box when such calculated levels deviate from or exceed such levels or limits.

III. SUMMARY OF THE INVENTION

The control process and system of the present invention uses a controller which receives values from a single gas sensor (preferably a carbon dioxide sensor) and uses such values to derive the approximate oxygen and carbon dioxide levels within a transport refrigeration cargo unit. The control process further comprises a means for inputting desired preselected levels (preferably desired limits) for the oxygen and carbon dioxide levels within the cargo box. If the values derived from the sensor deviate from or exceed the preselected limits (e.g., if the carbon dioxide value obtained from a carbon dioxide sensor rises above a preselected maximum level, or if the oxygen level derived from the same sensor falls below a preselected minimum level), then the controller will actuate an opening to bring in fresh air until the oxygen and carbon dioxide levels fall within the preselected limits again.

IV. BRIEF DESCRIPTION OF THE DRAWINGS

The present invention is illustrated by way of example and not limitation in the Figures of the accompanying drawings in which like references indicate similar elements, and in which:

FIG. 3 illustrates a flow chart practicing a first preferred method embodying the present invention; and FIG. 4 illustrates a flow chart practicing a second preferred method embodying the present invention.

V. BRIEF DESCRIPTION OF THE PREFERRED EMBODIMENT

Figure 1:
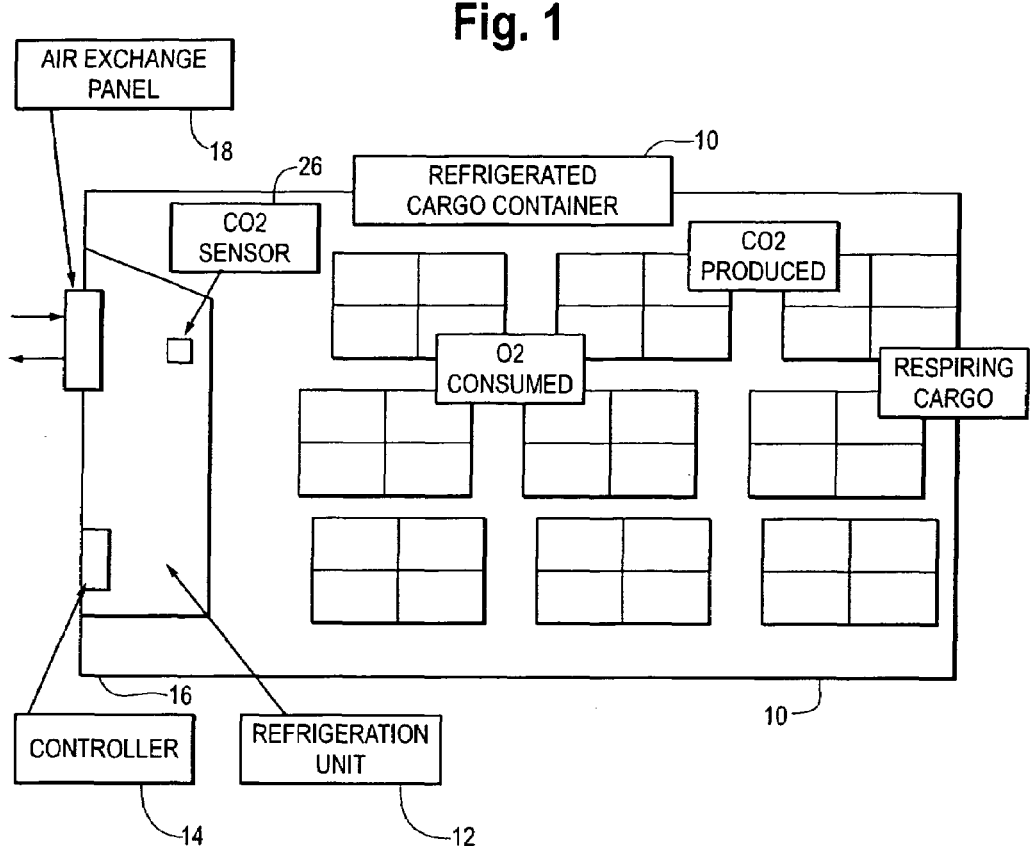
FIG. 1 illustrates a block diagram of a cargo unit practicing an example embodiment of the present invention.
Figure 2:
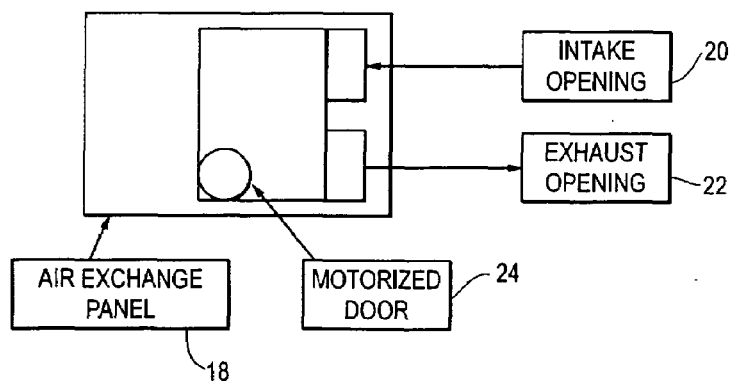
FIG. 2 illustrates a simplified diagram of the preferred embodiment of the air exchange panel of the present invention.

The diagrams showing a preferred embodiment of the claimed system are shown in FIGS. 1 and 2. The refrigerated cargo unit 10 may consist of a container, truck trailer or comparable unit for containing perishable goods. The unit 10 typically houses a refrigeration unit 12 which is controlled by a controller 14. The unit 10 further includes at least one wall 16 which comprises, at least in part an air exchange panel 18. Air exchange panel 18 includes an intake opening 20 and an exhaust opening 22. A motorized cover 24 preferably slides to cover these openings, in part or in whole, based upon direction by controller 14 in response to the input from a carbon dioxide sensor 26 as described in greater detail below.

The controller of the present invention is capable of receiving an input from a single sensor, such as carbon dioxide sensor 26, and determining the approximate concentrations of at least the oxygen and carbon dioxide levels within cargo unit 10. In most cases of horticultural (perishable) cargo, the respiration quotient or RQ (the ratio of the amount of carbon dioxide produced to the amount of oxygen consumed) is approximately 1. With this in mind, a simple calculation using the reading of one sensor is all that is required to determine both the oxygen and carbon dioxide concentrations in the cargo unit 10. Given that cargo handled by systems employing the present invention is typically loaded in normal atmospheric conditions containing approximately 21% oxygen and negligible amounts of carbon dioxide, and further assuming that respiration of the cargo and the air exchange from normal atmosphere outside the container are the only influences to the container atmosphere, the approximate amount of oxygen in the container can be calculated by taking the measured carbon dioxide and subtracting it from 21 percent. For example, for cargo loaded in normal conditions and having an RQ of about 1, a reading of 5% carbon dioxide could be used to derive an approximate oxygen level of 16% in the unit 10. Conversely, by using only an oxygen gas sensor 26 in the practice of the present invention, the readings of the oxygen sensor could likewise be used to derive the carbon dioxide levels.

In addition, in some cases, those of ordinary skill will understand that the RQ does not equal 1. For example, RQ levels of greater than 1 exist for acidic cargo such as apples or grapes, and RQ values for cargos high in lipids are less than 1 (e.g., avocados). Given a known value for the RQ of the cargo to be shipped (which can either be programmed in by a user establishing set points, or preprogrammed for simple identification by the shipper of the cargo in the unit), a calculation can be made for the concentration of one gas (e.g., oxygen) based upon the measurement from a sensor of the other gas (e.g., carbon dioxide).

Those of skill in the art upon reviewing this disclosure will understand that other trace gases (e.g., ethylene) may be produced by respirating cargo, and that other trace gases (e.g., Argon) are present at low levels in normal atmospheric conditions. The impact of such gases on the accuracy of the calculation performed by the present invention is insignificant for this type of system where a main function is to limit certain gas concentrations. Where a user intends to more precisely control gas levels (such as a controlled atmosphere system which injects nitrogen into the enclosed space) the inventors of the present invention believe that a better approach may be to use multiple gas sensors with a controller which may or may not be capable of using the derivation techniques taught by the present invention.

In the present invention, the use of a carbon dioxide sensor instead of an oxygen sensor is more preferred for at least two reasons. First, by using a carbon dioxide sensor, the system is measuring the primary gas that is limited in fresh air systems, thus eliminating potential error introduced by other gases, such as the creation of ethylene referenced above. This accuracy is particularly significant because in a closed container with respiring cargo, the carbon dioxide concentration will typically reach a damaging concentration (i.e., too high) long before the oxygen level will reach a damaging concentration (i.e., too low). Second, the inventors of the present invention believe that the most cost effective commercially available oxygen sensors on the market require periodic calibrations at both ends of the measurement spectrum with specialized gas containing no oxygen and using normal atmosphere at 21% oxygen. Thus, the use of an oxygen sensor instead of a carbon dioxide sensor requires substantially more service and equipment support for maintaining good accuracy. The carbon dioxide sensor requires less frequent calibrations only at the "carbon dioxide free" end of its measurement range, such calibrations being accomplished with clean fresh air from a normal atmosphere.

The systems in the present invention may require the constant use of carbon dioxide and/or oxygen monitoring and limits, or in the alternative the user may opt out of this feature. The control algorithm for controlling carbon dioxide and oxygen levels near a limit setting in accord with the process of the present invention is shown in the schematic of FIG. 3. Most preferably, the method of the present invention will typically begin when the cargo unit has completed its initial temperature pulldown, or if the temperature detected is no more than 5 degrees Celsius above the initial setpoint and the initial pulldown has not occurred. The preferred method involves a first step 30 of the controller monitoring the carbon dioxide and oxygen levels and the step 32 of selectively opening the motorized sliding cover 24 to a predetermined position providing for airflow through the inlet and exhaust openings (e.g., "10 CFH [cubic feet per hour]" position) when either the oxygen or carbon dioxide levels derived from the carbon dioxide sensor 26 deviate from their desired preselected levels (i.e., the carbon dioxide level sensed is above the preselected level or the oxygen level derived from that sensor reading falls below its preselected level). These preselected oxygen and carbon dioxide levels may be input through user interface 27 at the cargo unit (e.g., by a DTMF type pad, at a remote location which is then input to the unit by RF signal or an RS-232 link, or by any method that is known to those of skill in the art. Likewise, such input devices can also be used for other parameters relevant to possible applications of the present invention (e.g., the type of cargo involved, or the RQ value corresponding to such cargo).

Once the cover has been actuated open, the controller further performs the step 34 of continuing monitoring and comparing the carbon dioxide and oxygen levels against preselected gas limits to determine whether gas values derived from the carbon dioxide sensor input exceeds each of the preselected gas limits by at least one half percent (i.e., whether the measured carbon dioxide level is at least one half percent less than the predetermined limit and the oxygen level is at least one half percent greater than the predetermined limit). If the gas limits are satisfied within 15 minutes after the motorized cover has slid to its predetermined position, the cover will slide closed until one or both gas limits are exceeded again. If the desired carbon dioxide limit is 0%, then 0.5% will be added to the carbon dioxide limit at the time for comparison of the limit to the carbon dioxide level input by the sensor.

If, however, the controller determines that either gas limit is not satisfied for 15 minutes after the cover slides open to its predetermined position, then the controller performs the step 36 of actuating the sliding cover to open additional increments (e.g., providing for an additional 10 CFH of airflow) every 15 minutes until both the gas limits are satisfied as per step 34 above. Once the gas limits are satisfied, the controller will perform the step 42 of closing the cover 24.

A second preferred embodiment of the invention for controlling airflow once a limit has been exceeded is shown in the schematic of FIG. 4. Similar to the first preferred embodiment, this method involves a first step 30 of the controller monitoring the carbon dioxide and oxygen levels and the step 32 of selectively opening the motorized sliding cover 24 to a predetermined position exposing a percentage of the inlet and exhaust openings (e.g., a "25% open" position) when either the oxygen or carbon dioxide levels derived from the carbon dioxide sensor 26 exceed their preselected limits. This embodiment also further performs the step 34 of continuing monitoring and comparing the carbon dioxide and oxygen levels against preselected gas limits to determine whether gas values derived from the carbon dioxide sensor input exceeds each of the preselected gas limits by at least one half percent. As with the first preferred embodiment, if the controller determines that either gas limit is not satisfied for 15 minutes after the cover slides open to its predetermined position, then the controller performs the step 36 of actuating the sliding cover to open additional increments (e.g., 10% of the exhaust and inlet openings) every 15 minutes until both the gas limits are satisfied as per step 34 above. Once the gas limits are satisfied, the controller will perform the step 38 of actuating the cover to slide to its original position. If conditions are not met with any of the incrementally greater openings, and both gas limits are not met after the openings fully exposed for 90 minutes, the controller will perform the step 40 of activating an alarm (not shown). If, however, the conditions are met and the cover slides back to its original position, the controller will continue to monitor for an additional 15 minutes to see that the conditions are still met (similar to monitoring step 34, above), and will then perform the step 42 of closing the cover if conditions are met for that period of time.

It will be appreciated by those skilled in the art that various changes, additions, omissions, and modifications can be made to the illustrated embodiments without departing from the spirit of the present invention. For instance, it should be understood that the vent openings can be incremented for adjustment either in terms of air flow (e.g., adjusting the openings to provide a given amount of air measured in CFM or CMH) or in terms of the percentage of the vent opening (e.g., a percentage of the surface area of the vent opening space). Furthermore, it should be understood that the most preferred embodiments practicing the invention are intended to control oxygen and carbon dioxide levels near a limit setting, but that alternative practices such as adjusting a vent once a limit is exceeded could be likewise covered by the claims. In addition, the algorithm of the present invention could avoid use of an RQ value, or such a value could be calculated or determined by the user or operator and input on a number pad connected to the controller, or the value could be preprogrammed and used upon selection or identification to the controller of the cargo to be shipped. Likewise, while there are substantial differences and advantages to using a single carbon dioxide sensor in lieu of an oxygen sensor, certain of the advantages of the present invention (e.g., calculating two gas values from a single gas sensor) would apply equally to systems using a single oxygen sensor (instead of a carbon dioxide sensor) wherein the controller derives approximate carbon dioxide gas levels based upon readings or input from the oxygen sensor. All such modifications and changes are intended to be covered by the following corresponding claim language.

We claim:

1. A control system for an enclosed transport refrigeration unit comprising:
   a) a single carbon dioxide sensor;
   b) an adjustable aperture for providing airflow into and out of said enclosed transport unit;
   c) a controller operatively connected to said carbon dioxide sensor and said aperture, wherein the controller adjusts the aperture upon receiving a signal from said sensor which corresponds to oxygen and carbon dioxide values deviates from preselected carbon dioxide or oxygen values.

2. The control system of claim 1, wherein the preselected level corresponds to the minimum level of oxygen desired in the transport refrigeration unit.

3. The control system of claim 1, wherein the preselected level corresponds to the maximum level of carbon dioxide desired in the transport refrigeration unit.

4. A control system for an enclosed transport refrigeration unit comprising:
   a) a single carbon dioxide sensor;
   b) an adjustable aperture for providing airflow into and out of said enclosed transport unit;
   c) a controller operatively connected to said carbon dioxide sensor and said aperture, wherein the controller adjusts the aperture upon receiving a signal from said sensor which corresponds to an oxygen and carbon dioxide values wherein at least one of the oxygen and carbon dioxide values approaches a preselected limit.

5. A control system for an enclosed transport refrigeration unit comprising:
   a) a single carbon dioxide sensor;
   b) an adjustable aperture for providing airflow into and out of said endosed transport unit;
   c) a controller operatively connected to said carbon dioxide sensor and said aperture, wherein the controller adjusts the aperture upon receiving a signal from said sensor which corresponds to oxygen and carbon dioxide values wherein at least one of the oxygen and carbon dioxide values deviates from a preselected set point.

6. A control system for an enclosed transport refrigeration unit comprising:
   a) single oxygen sensor;
   b) an adjustable aperture for providing airflow into and out of said enclosed transport unit;
   c) a controller operatively connected to said oxygen sensor and said aperture, wherein the controller adjusts the aperture upon receiving a signal from said sensor which corresponds to oxygen and carbon dioxide values wherein at least one of the oxygen and carbon dioxide values is in excess of a preselected level.

7. A control system for an enclosed transport refrigeration unit comprising:
   a) a single oxygen sensor;
   b) an adjustable aperture for providing airflow into and out of said enclosed transport unit;
   c) a controller operatively connected to said oxygen sensor and said aperture, wherein the controller adjusts the aperture upon receiving a signal from said sensor which which corresponds to oxygen and carbon dioxide values wherein at least one of the oxygen and carbon dioxide values approaches a preselected limit.

8. A control system for an enclosed transport refrigeration unit comprising:
   a) a single oxygen sensor;
   b) an adjustable aperture for providing airflow into and out of said enclosed transport unit;
   c) a controller operatively connected to said oxygen sensor and said aperture, wherein the controller adjusts the aperture upon receiving a signal from said sensor which corresponds to oxygen and carbon dioxide values wherein at least one of the oxygen and carbon dioxide values deviates from a preselected oxygen or carbon dioxide set point.

9. A control system for an enclosed transport refrigeration unit comprising:
 a) a single gas sensor;
 b) an adjustable aperture for providing airflow into and out of said enclosed transport unit;
 c) a controller operatively connected to said gas sensor and said aperture, wherein the controller adjusts the aperture upon receiving a signal from said sensor which corresponds to a gas value in excess of a preselected limit, said controller further being capable of comparing both oxygen and carbon dioxide values derived from the single gas sensor against corresponding oxygen and carbon dioxide limits.

10. A control system for an enclosed transport refrigeration unit comprising:
 a) a single gas sensor;
 b) an adjustable aperture for providing airflow into and out of said enclosed transport unit;
 c) a user interface, said user interface providing a plurality of selectable load categories, each of said categories having predefined respiration quotients;
 d) a controller operatively connected to said gas sensor and said aperture, wherein the controller adjusts the aperture upon receiving a signal from said sensor which corresponds to oxygen and carbon dioxide values, wherein said values are derived from said respiration quotients and said values are in excess of preselected oxygen and carbon dioxide limits.

11. A control system for an enclosed transport refrigeration unit comprising:
 a) a single gas sensor;
 b) an adjustable aperture for providing airflow into and out of said enclosed transport unit;
 c) a user interface, said user interface providing a plurality of selectable load categories, each of said categories corresponding to predefined oxygen and carbon dioxide limits;
 d) a controller operatively connected to said gas sensor and said aperture, wherein the controller adjusts the aperture upon receiving a signal from said sensor which corresponds to oxygen and carbon dioxide values wherein at least one of the oxygen and carbon dioxide values is in excess of the oxygen and carbon dioxide limits which correspond to the selected load category.

* * * * *